United States Patent
Shi et al.

(10) Patent No.: US 10,034,320 B2
(45) Date of Patent: Jul. 24, 2018

(54) SYSTEM AND METHODS FOR PERFORMING AN ADAPTIVE ACCESS PROCEDURE ON A MULTI-SIM WIRELESS COMMUNICATION DEVICE

(71) Applicant: QUALCOMM Incorporated, San Diego, CA (US)

(72) Inventors: Yongsheng Shi, San Diego, CA (US); Ayyappan Ravichandran, San Diego, CA (US); Zhang Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/266,857

(22) Filed: Sep. 15, 2016

(65) Prior Publication Data

US 2018/0077728 A1 Mar. 15, 2018

(51) Int. Cl.
*H04W 76/10* (2018.01)
*H04W 74/08* (2009.01)
*H04W 68/00* (2009.01)
*H04W 88/06* (2009.01)

(52) U.S. Cl.
CPC .......... *H04W 76/10* (2018.02); *H04W 68/00* (2013.01); *H04W 74/085* (2013.01); *H04W 74/0833* (2013.01); *H04W 88/06* (2013.01)

(58) Field of Classification Search
CPC .......... H04W 74/0833; H04W 74/085; H04W 76/02; H04W 76/10
See application file for complete search history.

(56) References Cited

U.S. PATENT DOCUMENTS

| 2003/0181216 | A1  | 9/2003 | Tsai et al. |          |
|--------------|-----|--------|-------------|----------|
| 2006/0176870 | A1* | 8/2006 | Joshi ...................... | H04W 88/06 370/345 |
| 2013/0065644 | A1* | 3/2013 | Bishop .................. | H04W 8/183 455/558 |

(Continued)

FOREIGN PATENT DOCUMENTS

EP 2461639 A1 6/2012

OTHER PUBLICATIONS

International Search Report and Written Opinion—PCT/US2017/044390—ISA/EPO—dated Oct. 13, 2017.

*Primary Examiner* — Gary Mui
(74) *Attorney, Agent, or Firm* — The Marbury Law Group, PLLC

(57) ABSTRACT

Methods and systems are provided to perform an adaptive access procedure on a multi-subscriber identity module (SIM) wireless communication device having at least a first SIM and a second SIM associated with a shared radio frequency (RF) resource. The wireless communication device may detect that signaling on a random access channel (RACH) is required in order to establish access to a first network on a modem stack associated with the first SIM, identify a first protection window having a duration based on timing of an expected response by the first network to signaling on the RACH, and determine whether a tune-away period to decode a paging channel in a second network supported by the second SIM is scheduled to occur within the first protection window. If so, the wireless communication device may postpone signaling on the RACH until completion of the scheduled tune-away period.

27 Claims, 9 Drawing Sheets

(56) References Cited

U.S. PATENT DOCUMENTS

| | | | | |
|---|---|---|---|---|
| 2013/0260778 A1* | 10/2013 | Roullier | ................ | H04W 76/02 |
| | | | | 455/452.1 |
| 2014/0119345 A1* | 5/2014 | Sikri | .................. | H04W 76/048 |
| | | | | 370/336 |
| 2014/0120925 A1* | 5/2014 | Kanthala | ............... | H04W 72/04 |
| | | | | 455/450 |
| 2014/0199993 A1* | 7/2014 | Dhanda | ................ | H04W 52/38 |
| | | | | 455/423 |
| 2014/0220981 A1* | 8/2014 | Jheng | ................. | H04W 76/045 |
| | | | | 455/437 |
| 2016/0174187 A1* | 6/2016 | Gopala Krishnan | . | H04W 68/02 |
| | | | | 455/458 |
| 2016/0249320 A1* | 8/2016 | Sanka | ................... | H04W 68/02 |
| 2016/0345351 A1* | 11/2016 | Bhattacharjee | ....... | H04W 48/18 |

* cited by examiner

SYSTEM AND METHODS FOR PERFORMING AN ADAPTIVE ACCESS PROCEDURE ON A MULTI-SIM WIRELESS COMMUNICATION DEVICE

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UNITS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Multi-subscriber identity module (SIM) wireless devices have become increasing popular because of their flexibility in service options and other features. One type of multi-SIM wireless device, a dual-SIM dual-standby (DSDS) device, enables both SIMs to be in idle mode waiting to begin communications, but only allows one SIM at a time to participate in an active communication due to sharing of a single radio frequency (RF) resource (e.g., transceiver). Other multi-SIM devices that extend this capability to more than two SIMs are referred to as multi-SIM, multi-standby (MSMS) devices, and may be configured with any number of SIMs greater than two (i.e., multi-SIM multi-standby wireless devices).

Multi-SIM wireless devices can have multiple subscriptions to one or more wireless networks. For example, in a DSDS device, a first subscription may support networks using a first technology standard, such as Long Term Evolution (LTE) or Wideband Code Division Multiple Access (WCDMA), while a second subscription may support a second technology standard, such as Global System for Mobile Communications (GSM) Enhanced Data rates for GSM Evolution (EDGE) (also referred to as GERAN). A DSDS device enables both SIMs to be in idle mode waiting to begin communications on their respective networks, but only allows one SIM at a time to participate in an active communication due to sharing of a single RF resource (e.g., a transceiver) configured to both communication technologies.

SUMMARY

Systems, methods, and devices of various embodiments may enable a wireless communication device configured to use at least a first SIM and a second SIM associated with a shared radio frequency (RF) resource to perform an adaptive access procedure. Various embodiments may include detecting that signaling on a random access channel (RACH) is required in order to establish access to a first network on a modem stack associated with the first SIM, identifying a first protection window having a duration based on timing of an expected response by the first network to signaling on the RACH, determining whether a tune-away period to decode a paging channel in a second network supported by the second SIM is scheduled to occur within the first protection window, and postponing signaling on the RACH until completion of the scheduled tune-away period in response to determining that a tune-away period to the second network supported by the second SIM is scheduled to occur within the first protection window.

In some embodiments, identifying a first protection window time duration based on timing of an expected response by the first network to signaling on the RACH may include identifying a radio access technology of the first network, identifying a percentage that represents an acceptable probability that a downlink response message from the first network will be received on the first modem stack, and calculating a time duration in which a percentage of downlink response messages that are received using the identified radio access technology corresponds to the identified percentage representing the acceptable probability. In such embodiments, the percentage of downlink response messages that are received using the identified radio access technology may be statistically determined based on field data of a plurality of wireless communication devices, wherein the field data is received from the first network.

In some embodiments, the signaling on the RACH may include transmitting a connection request message to the first network by the modem stack associated with the first SIM. Such embodiments may further include transmitting the connection request message in response to determining that a tune-away period to the second network supported by the second SIM is not scheduled to occur within the first protection window, and starting a first protection window timer, a retry timer, and a second protection window timer upon transmission of the connection request message.

In some embodiments, the first protection window timer may have a value equal to the time duration of the first protection window. In some embodiments, the time duration of the first protection window may be within a range of around 50-300 ms. In some embodiments, the retry timer may have a value within a range of 1-3 seconds. In some embodiments, the value of the retry timer may be derived from system information broadcast by the first network, and the second protection window timer may have a value within a range of 500 ms to 1 second. In some embodiments, the value of the second protection window timer may be in-between the values of the first protection window timer and the retry timer.

Some embodiments may further include determining whether a downlink response to the connection request message has been received on the modem stack associated with the first SIM, determining whether the first protection window timer has expired, and preventing tune-away periods on the RF resource to the second network in response to determining that a downlink response to the connection request message has not been received and that the first protection window timer has not expired.

Some embodiments may further include determining whether a connection request is granted in response to determining that a downlink response to the connection request message has been received on the modem stack associated with the first SIM, determining whether the downlink response includes a wait-time for retransmitting the connection request message in response to determining that the connection request was not granted, and allowing tune-away periods to the second network for all idle mode tasks on the modem stack associated with the second SIM during the wait-time in response to determining that the downlink response includes a wait-time for retransmitting the connection request message.

Some embodiments may further include allowing scheduled tune-away periods for decoding the paging channel in the second network while preventing tune-away periods for non-paging idle mode tasks in response to determining that the first protection window timer has expired, determining whether a downlink response to the connection request message has been received on the modem stack associated with the first SIM, and continuing to allow scheduled tune-away periods for decoding the paging channel in the second network while preventing tune-away periods for non-paging idle mode tasks in response to determining that a downlink response to the connection request message has not been received and that the second protection window timer has not expired.

Some embodiments may further include determining whether the second protection window timer has expired, and allowing tune-away periods to the second network for all idle mode tasks in response to determining that the second protection window timer has expired. Some embodiments may further include determining whether a downlink response to the connection request message has been received on the modem stack associated with the first SIM, determining whether the retry timer has expired, and continuing to allow tune-away periods to the second network for all idle mode tasks in response to determining that a downlink response to the connection request message has not been received and that the retry timer has not expired. In some embodiments, determining whether a tune-away period to a second network supported by the second SIM is scheduled to occur within the first protection window for the shared RF resource may be based on information about a paging cycle associated with the first SIM.

Various embodiments include a wireless communication device configured to use at least a first subscriber identity module (SIM) and a second SIM associated with a shared RF resource, and including a processor configured with processor-executable instructions to perform operations of the methods summarized above. Various embodiments also include a non-transitory processor-readable medium on which is stored processor-executable instructions configured to cause a processor of a wireless communication device to perform operations of the methods summarized above. Various embodiments also include a wireless communication device having means for performing functions of the methods summarized above.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1A:
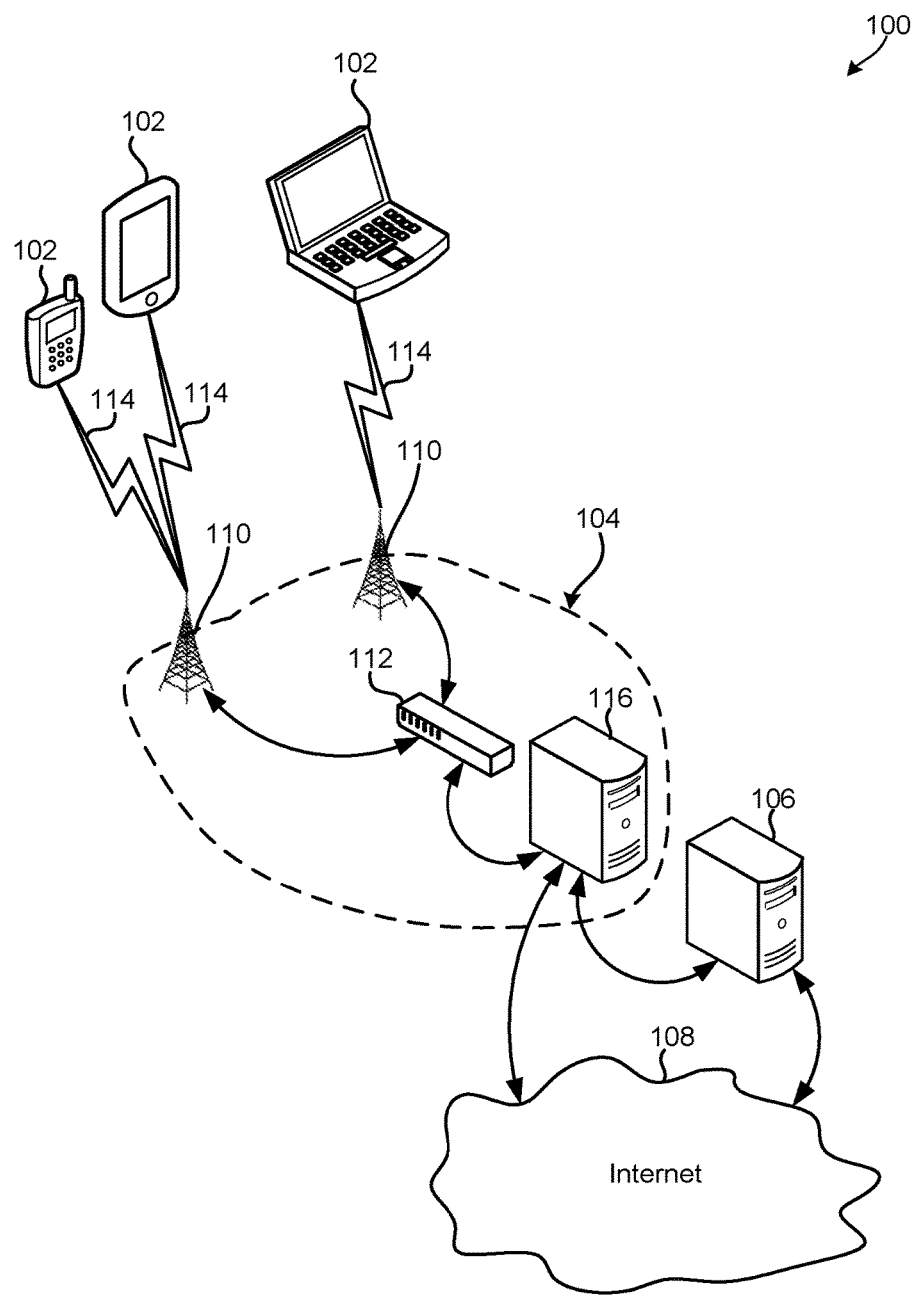
FIG. 1A is a communication system block diagram of a network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Modern wireless communication devices may now include a plurality of SIM cards that enable a user to connect to different mobile networks while using the same mobile communication device. Each SIM card serves to identify and authenticate a subscriber using a particular mobile communication device, and each SIM card is associated with only one subscription. For example, a SIM card may be associated with a subscription to one of a GSM, TD-SCDMA, CDMA2000, and/or Wideband Code Division Multiple Access (WCDMA) system. Further, multi-SIM operations may be applicable to any of a number of wireless communication system, using various multiple access schemes, such as, but not limited to, Code Division Multiple Access (CDMA), Frequency Division Multiple Access (FDMA), Orthogonal Frequency Division Multiple Access (OFDMA), or Time Division-Multiple Access (TDMA).

Normal RF resource arbitration may be employed to schedule use of a RF resource shared between SIMs on a MSMS wireless communication device. While such sharing may be limited to transmit and/or receive functions, in some MSMS wireless communication devices the sharing may extend to functions associated with a baseband-modem processor. Examples of baseband-modem processor functions that may be shared depend on the particular access technology, but can include downlink/uplink common channel processing, downlink/uplink common signal processing, receive/transmit signal processing, etc.

In an MSMS device in which the shared RF resource is used for an active communication on a first SIM, a second SIM may be in an idle mode and not actively contending for access to the RF resource. However, the MSMS device may maintain a connection with a serving network associated with the second SIM by performing limited communication activities (i.e., "idle mode tasks"). Depending on the communication protocol, examples of idle mode activates may include receiving system information, decoding a paging channel, measuring signal strength of neighbor cells, etc.

While an MSMS wireless device is in an active communication with a network (a "first network") associated with one SIM (the "first SIM"), the wireless device may maintain a communication link with a network (a "second network") associated with another SIM (e.g., the "second SIM") by periodically tuning from the first network to the second network to monitor for incoming paging messages or receive other information (referred to herein as a "tune away"). Performing idle mode tasks for the second SIM during an active communication on the first SIM may involve implementing discontinuous reception (DRX) on the second SIM. In an "awake" period of the DRX cycle, the shared RF resource may tune away from the first network associated with the first SIM and tune to the second network supporting the subscription enabled by the second SIM to perform idle mode activities, followed by tuning back to the communication on the first SIM.

During tune-away periods, the wireless device loses the downlink information on the active communication with the first network, and typically cancels any ongoing uplink communications with the first network because the RF resource is temporarily unavailable. Since data transfers for the active communication are typically performed in a mode that enables automatic retransmission of erroneous or missing data blocks, downlink information lost during the tune-away may be recovered on the active communication.

In some wireless communication devices, a random access channel (RACH) may be used to send a connection request message to a network associated with the first SIM in an access procedure. In contrast to data transmissions when the connection is established (i.e., in a radio resource control (RRC) connected mode), uplink transmissions on RACH are generally not acknowledged by the network. Therefore, if the wireless communication device fails to receive a downlink message after the transmission on the RACH, the access procedure must be restarted. Further, a wait-time may be triggered by a second layer of the modem stack associated with the first SIM (e.g., MAC layer, data link layer, L2, etc.), delaying the restart of the access procedure until expiration of the wait-time. Therefore, when a scheduled tune-away period for the second SIM occurs during an access procedure for the first SIM the length of time it takes to transition to the connected mode for the first SIM may be increased, impacting user experience. Thus, a trade-off exists between the ability to decode the paging channel on the network associated with the second SIM and setting up the communication on the network associated with the first SIM.

The various embodiments improve performance on a wireless communication device by mitigating the delay in accessing a network on a first SIM without losing service or missing pages for a second SIM. In particular, when an upcoming tune-away period will overlap with a downlink response to a connection request message that will be sent on RACH for the first SIM, the wireless communication device may implement an adaptive access procedure that adjusts timing of the connection request message to avoid the potential collision. That is, the adaptive access procedure may arbitrate access to a shared RF resource to reduce the likelihood of simultaneous occurrence of high priority operations on each modem stack.

In various embodiments, when access to a network supported by a first SIM is required (i.e., an idle-to-connected mode transition), the wireless communication device may determine, prior to sending the connection request message, whether there is sufficient time to receive a network response before a scheduled tune-away period. If there is not sufficient time, the wireless communication device may wait until completion of the upcoming tune-away period before transmitting the connection request message. Further, tune-away periods for idle mode tasks other than paging occasions (e.g., cell reselection, decoding system information, etc.) may be blocked by the wireless communication device until after expiration of one or more timers in order to avoid unnecessarily delays to the connection establishment for the first SIM.

The terms "wireless device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM As used herein, the term "radio frequency resource" and "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain." In some embodiments, an RF resource may refer to components that also perform functions associated with a baseband-modem processor, such as modulating and demodulating RF signals and packetizing incoming and outgoing data.

As used herein, the terms "multi-SIM multi-standby communication device" and "MSMS wireless device" are used interchangeably to refer to a wireless communication device that is configured with more than one SIM and allows idle-mode operations to be performed on two networks simultaneously using a single RF resource. Dual-SIM dual-standby communication devices are an example of a type of MSMS communication device.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks such as CDMA, time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including WCDMA standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. While various embodiments may be described with respect to LTE, such embodiments but may be extended to other telecommunication standards employing other modulation and multiple access techniques. Further references to particular types of communication technologies, standards or protocol are provided merely as examples, and are not intended to exclude wireless networks that use other communication technologies, standards or protocol.

References herein to "first" and "second" SIMs, subscriptions and networks are arbitrary and used merely for convenience in describing various embodiments. As a matter of convenience, a subscription associated with a SIM that is in an active data communication session on a network is referred to as the "first subscription" or the "first SIM" communicating on a "first network," while all other subscriptions and SIMs (i.e., subscriptions/SIMs in idle mode and periodically performing tune-aways to another network) are referred to as a "second subscription" and "second SIM" communicating with an associated "second network." Thus, references to first and second SIMs are not intended to limit the scope of the claims to only two SIMs as various embodiments also apply to multi-SIM wireless communication device supporting three or more SIMs. Further, references to "first SIM" and "second SIM" are intended to be temporary references during a particular active communication session, because at a later point in time a subscription that was previously in an idle mode (i.e., previously a second SIM) may commence an active communication session (thus becoming a first SIM) and causing a subscription that was previously active (i.e., previously a first SIM) to enter the idle mode (thus becoming a second SIM). The multi-SIM wireless communication device processor may assign any indicator, name or other designation to differentiate the one or more SIM sand associated modem stacks.

A multi-SIM wireless device that supports two or more SIM cards may have a number of capabilities that provide convenience to a user, such as allowing different wireless carriers, plans, telephone numbers, billing accounts, etc. on one device. In some wireless networks, a wireless communication device may have multiple subscriptions to one or more networks (e.g., by employing multiple subscriber identity module (SIM) cards or otherwise). Such a wireless device may include, but is not limited to, a DSDS device. For example, a first subscription may be a first technology standard, such as Wideband Code Division Multiple Access (WCDMA), while a second subscription may support the same technology standard or a second technology standard, such as Global System for Mobile Communications (GSM) Enhanced Data rates for GSM Evolution (EDGE) (also referred to as GERAN).

For clarity, while the techniques and embodiments described herein relate to a wireless device configured with at least one WCDMA/UMTS SIM and/or GSM SIM, the embodiment techniques may be extended to subscriptions on other radio access networks (e.g., 1×RTT/CDMA2000, EVDO, LTE, WiMAX, Wi-Fi, etc.). In that regard, the messages, physical and transport channels, radio control states, etc. referred to herein may also be known by other terms in various radio access technologies and standards. Further, the messages, channels and control states may be associated with different timing in other radio access technologies and standards.

In various embodiments, an RF resource of an MSMS device (e.g., a DSDS device) may be configured to be shared between a plurality of SIMs, but may be employed by default to perform communications on a network enabled by a first SIM, such as a network capable of high-speed data communications (e.g., WCDMA, HSDPA, LTE, etc.). As such, a modem stack associated with a second SIM of the wireless device may often be in idle mode with respect to a second network. Depending on the radio access technology of the second network, operating in such an idle mode may involve implementing a power saving mode that includes a cycle of sleep and awake states. For example, if the second network is a GSM network, during idle mode the modem stack associated with the second SIM may implement discontinuous reception (DRX).

The timing of a wake-up period (i.e., awake state) may be set by the second network for a paging group to which the second SIM belongs. The modem stack associated with the second SIM may attempt to use the shared RF resource to decode a paging channel of the second network to receive paging messages. During the sleep state, the modem stack may power off most processes and components, including the associated RF resource. In some networks, such as GSM networks, the duration of time in the wake-up period in which a paging message may be received (i.e., duration of a paging occasion) is around 6 ms. Similarly, the paging cycle (e.g., the interval between the start of consecutive scheduled page decode/monitoring times) in a GSM network may typically be 470 ms.

Various embodiments may be implemented within many different communication systems, such as the example communication system 100 illustrated in FIG. 1A. The communication system 100 may include one or more wireless devices 102, a wireless communication network 104, and network servers 106 coupled to the wireless communication network 104 and to the Internet 108. In some embodiments, the network server 106 may be implemented as a server within the network infrastructure of the wireless communication network 104.

A typical wireless communication network 104 may include a plurality of cell base stations 110 coupled to a network operations center 112, which operates to connect voice and data calls between the wireless devices 102 (e.g., tablets, laptops, cellular phones, etc.) and other network destinations, such as via telephone land lines (e.g., a POTS (plain old telephone system) network, not shown) and the Internet 108. The wireless communication network 104 may also include one or more servers 116 coupled to or within the network operations center 112 that provide a connection to the Internet 108 and/or to the network servers 106. Communications between the wireless devices 102 and the wireless communication network 104 may be accomplished via two-way wireless communication links 114, such as GSM, UMTS, EDGE, fourth generation (4G), 3G, CDMA, TDMA, LTE, and/or other communication technologies.

In general, any number of wireless networks may be deployed in a given geographic area. Each wireless network may support one or more radio access technologies, which may operate on one or more frequency bands (also referred to as a carrier, channel, frequency channel, etc.) in the given geographic area in order to avoid interference between wireless networks of different radio access technologies.

Upon power up, the wireless device 102 may search for wireless networks from which the wireless device 102 can receive communication service. In various embodiments, the wireless device 102 may be configured to prefer LTE networks when available by defining a priority list in which LTE frequencies occupy the highest spots. The wireless device 102 may perform registration processes on one of the identified networks (referred to as the serving network), and the wireless device 102 may operate in a connected mode to actively communicate with the serving network.

Alternatively, the wireless device 102 may operate in an idle mode and camp on the serving network if an active communications session is not active on the wireless device 102. In the idle mode, the wireless device 102 may identify all radio access technologies (RATs) in which the wireless device 102 is able to find a "suitable" cell in a normal scenario or an "acceptable" cell in an emergency scenario, as specified in the LTE standards, such as 3GPP Technical Specification (TS) 36.304 version 8.2.0 Release 8, entitled "LTE; Evolved Universal Terrestrial Radio Access (E-UTRA); User Equipment (UE) procedures in idle mode" (May 2008), the details of which are incorporated by reference herein.

Figure 1B:
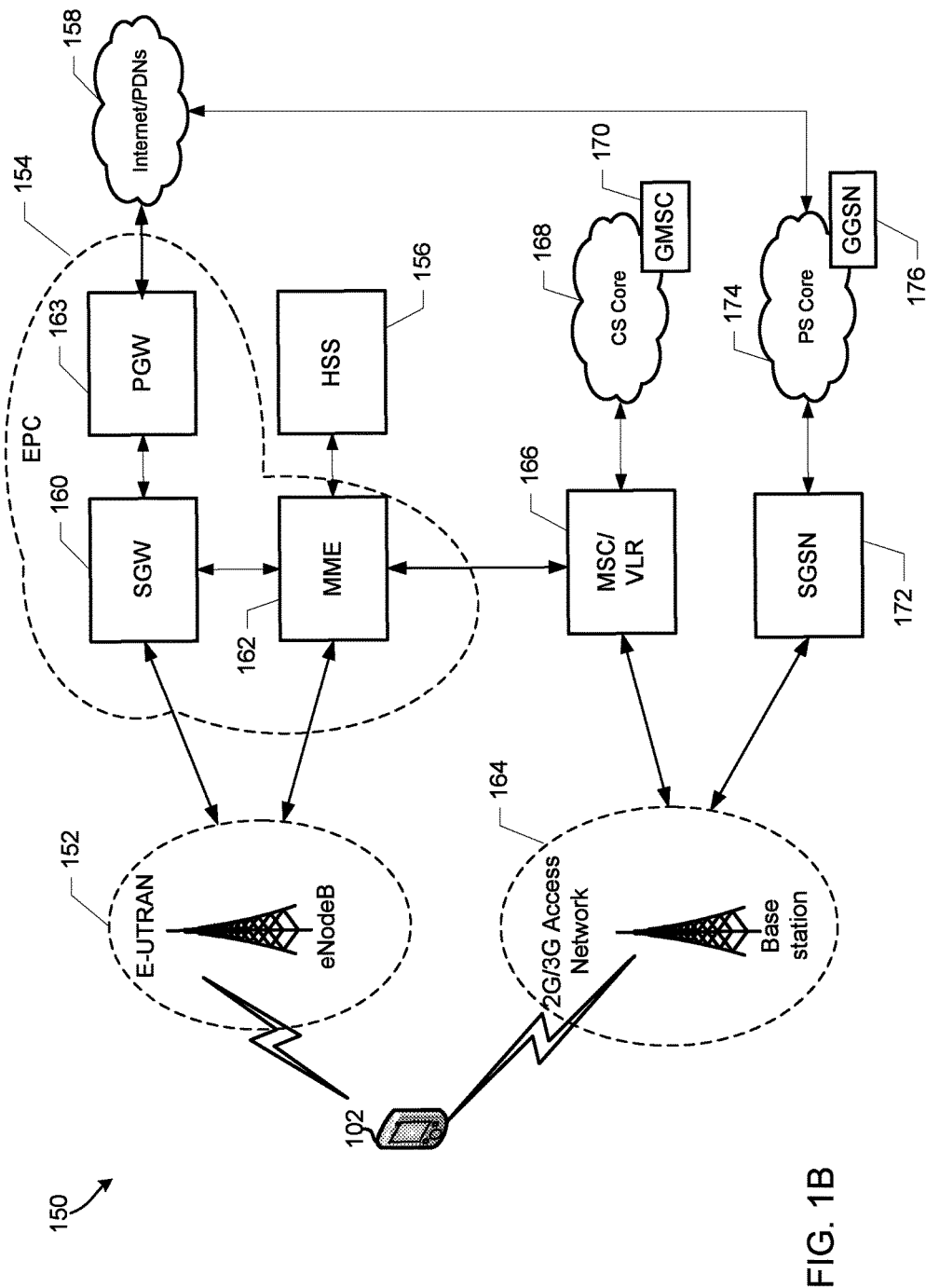
FIG. 1B is system block diagram of a network architecture suitable for use with the various embodiments.

FIG. 1B illustrates a network architecture 150 that includes an Evolved Packet System (EPS). With reference to FIGS. 1A-1B, in the network architecture 150 the wireless device 102 may be connected to an LTE access network, for example, an Evolved UMTS Terrestrial Radio Access Network (E-UTRAN) 152. In the various embodiments, the E-UTRAN 152 may be a network of LTE base stations (i.e., eNodeBs) (e.g., 110 in FIG. 1A), which may be connected to one another via an X2 interface (e.g., backhaul) (not shown).

Each eNodeB in the E-UTRAN 152 may provide an access point to an LTE core network, such as an Evolved Packet Core (EPC) 154. The EPC 154 may include at least one Mobility Management Entity (MME) 162, a Serving Gateway (SGW) 160, and a Packet Data Network (PDN) Gateway (PGW) 163. The E-UTRAN 152 may connect to the EPC 154 by connecting to the SGW 160 and to the MME 162 within the EPC 154. The MME 162, which may also be logically connected to SGW 160, may handle tracking and paging of the wireless device 102 and security for E-UTRAN access on the EPC 154. The MME 162 may be linked to a Home Subscriber Server (HSS) 156, which may support a database containing user subscription, profile, and authentication information. Further, the MME 162 provides bearer and connection management for user internet protocol (IP) packets, which are transferred through the SGW 160.

The SGW 160 may route incoming and outgoing IP packets for the wireless device 102 via the LTE access network and external IP networks (i.e., packet data networks (PDNs)). The SGW 160 may also provide an anchor point for handover between eNodeBs. The SGW 160 may be logically connected to a PDN Gateway (PGW) 163, which may route packets to and from PDNs to form a connection between the EPC and various PDNs. The PGW 163 may be logically connected to a Policy Charging and Rules Function (PCRF), a software component that may enforce minimum quality of service parameters, and manage and control data sessions. The PGW 163 may also provide connections with other public or private networks (e.g., the Internet, etc.).

The network architecture 150 may include circuit-switched (CS) networks and additional packet-switched (PS) networks. A wireless device 102 may be connected to the CS and/or PS packet switched networks by connecting to a legacy second generation (2G)/third generation (3G) access network 164. The 2G/3G access network 164 may be, for example, one or more of UTRAN, GSM Enhanced Data rates for Global Evolution (EDGE) Radio Access Network (GERAN), CDMA2000 1× radio transmission technology (1×RTT), CDMA2000 Evolution Data Optimized (EV-DO), etc. The 2G/3G access network 164 may include a network of base stations (e.g., base transceiver stations (BTSs), nodeBs, radio base stations (RBSs), etc.) (e.g., 110), as well as at least one base station controller (BSC) or radio network controller (RNC). The 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

The 2G/3G access network 164 may connect to the PS network via an interface with (or gateway to) a Serving GPRS support node (SGSN) 172, which may connect to a PS core 174. In the PS network, the PS core 174 may be connected to external PS networks, such as the Internet and the Operator's IP services 158 through a Gateway GPRS support node (GGSN) 176.

Modulation and radio access schemes may be employed by a high-speed access network (e.g., an E-UTRAN), and may vary depending on the particular telecommunications standard being deployed. For example, in LTE applications, orthogonal frequency-division multiplexing (OFDM) may be used on the downlink, while single-carrier frequency-division multiple access (SC-FDMA) may be used on the uplink to support both frequency division duplexing (FDD) and time division duplexing (TDD).

Access network entities (e.g., eNodeBs) may have multiple antennas supporting multiple-input, multiple-output (MIMO) technology, thereby enabling the eNodeBs to exploit the spatial domain to support spatial multiplexing, beamforming, and/or transmit diversity. Spatial multiplexing may be used to transmit different streams of data simultaneously on the same frequency. In some embodiments, the data steams may be transmitted to a single wireless device to increase the data rate, while in other instances the data streams may be transmitted to multiple wireless devices to increase the overall system capacity.

While the various embodiments may be described with reference to accessing LTE, various embodiments but may be extended to other telecommunication standards employing other modulation and multiple access techniques. By way of example, the various embodiments may be extended to EV-DO and/or Ultra Mobile Broadband (UMB), each of which are air interface standards promulgated by the 3rd Generation Partnership Project 2 (3GPP2) as part of the CDMA2000 family to provide broadband Internet access to wireless devices. The various embodiments may also be extended to IEEE 802.11 (Wi-Fi), IEEE 802.16 (WiMAX), IEEE 802.20, and/or Flash-OFDM employing OFDMA. The actual wireless communication standard and the access technology employed may depend on the specific application and the overall design constraints imposed on the system.

Figure 2:
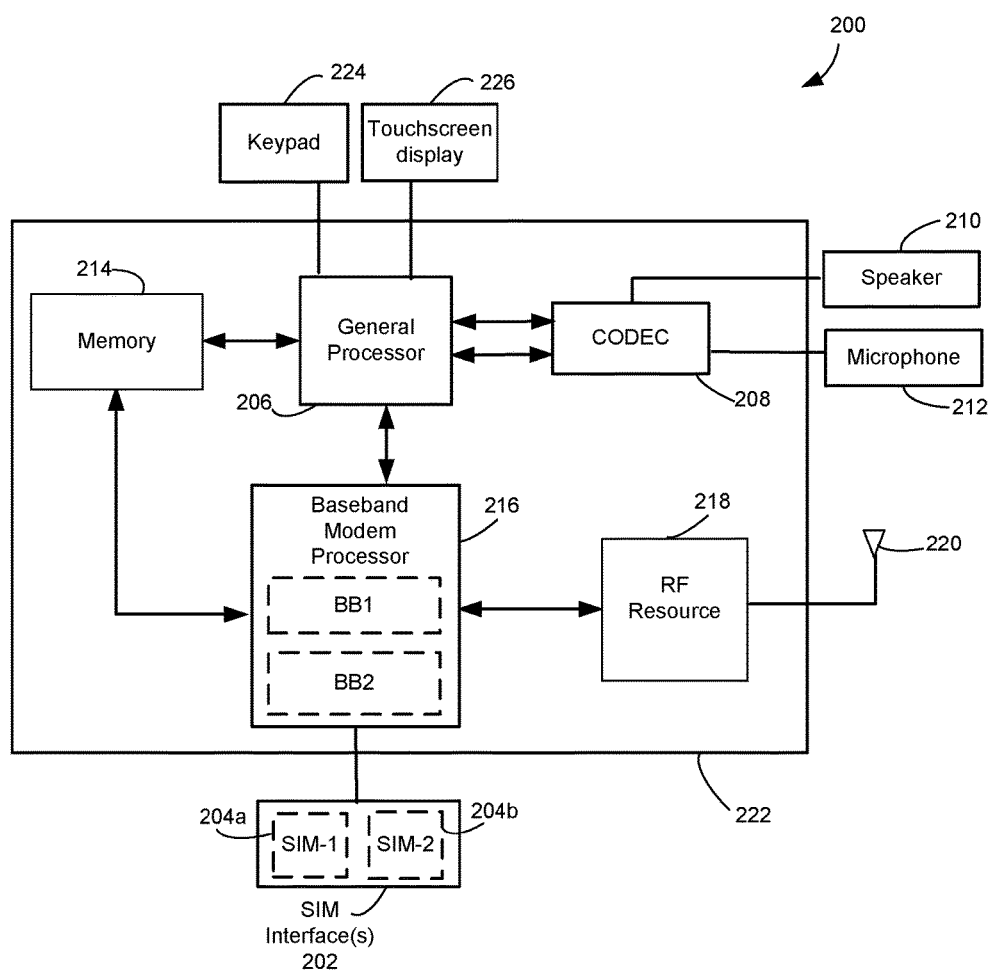
FIG. 2 is a block diagram illustrating a wireless communication device according to various embodiments.

FIG. 2 is a functional block diagram of an example wireless communication device 200 that is suitable for implementing various embodiments. According to various embodiments, the wireless device 200 may be similar to one or more of the wireless devices 102 described with reference to FIG. 1. With reference to FIGS. 1-2, in various embodiments, the wireless device 200 may be a single-SIM device, or a multi-SIM device, such as a dual-SIM device. In an example, the wireless device 200 may be a dual-SIM dual-active (DSDA) device or a dual-SIM dual-standby (DSDS) device. The wireless device 200 may include at least one SIM interface 202, which may receive a first SIM (SIM-1) 204a that is associated with a first subscription. In some embodiments, the at least one SIM interface 202 may be implemented as multiple SIM interfaces 202, which may receive at least a second SIM (SIM-2) 204b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. One or more of the first SIM 204a and second SIM 204b used in various embodiments may contain user account information, an IMSI a set of SIM application toolkit (SAT) commands and storage space for phone book contacts. One or more of the first SIM 204a and second SIM 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more SIM 204 for identification.

The wireless device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

The general purpose processor 206 and memory 214 may each be coupled to at least one baseband-modem processor 216. Each SIM 204a, 204b in the wireless device 200 may be associated with a baseband-RF resource chain that includes at least one baseband-modem processor 216 and at least one RF resource 218. In some embodiments, the wireless device 200 may be a DSDS device, with both SIMs 204a, 204b sharing a single baseband-RF resource chain that includes the baseband-modem processor 216 and RF resource 218. In some embodiments, the shared baseband-RF resource chain may include, for each of the first SIM 204a and the second SIM 204b, separate baseband-modem processor 216 functionality (e.g., BB1 and BB2). The RF resource 218 may be coupled to at least one antenna 220, and may perform transmit/receive functions for the wireless services associated with each SIM 204a, 204b of the wireless device 200. The RF resource 218 may implement separate transmit and receive functionalities, or may include a transceiver that combines transmitter and receiver functions.

In particular embodiments, the general purpose processor 206, memory 214, baseband-modem processor 216, and RF resource 218 may be included in a system-on-chip device 222. The first and second SIMs 204a, 204b and their corresponding interface(s) 202 may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

Figure 3:
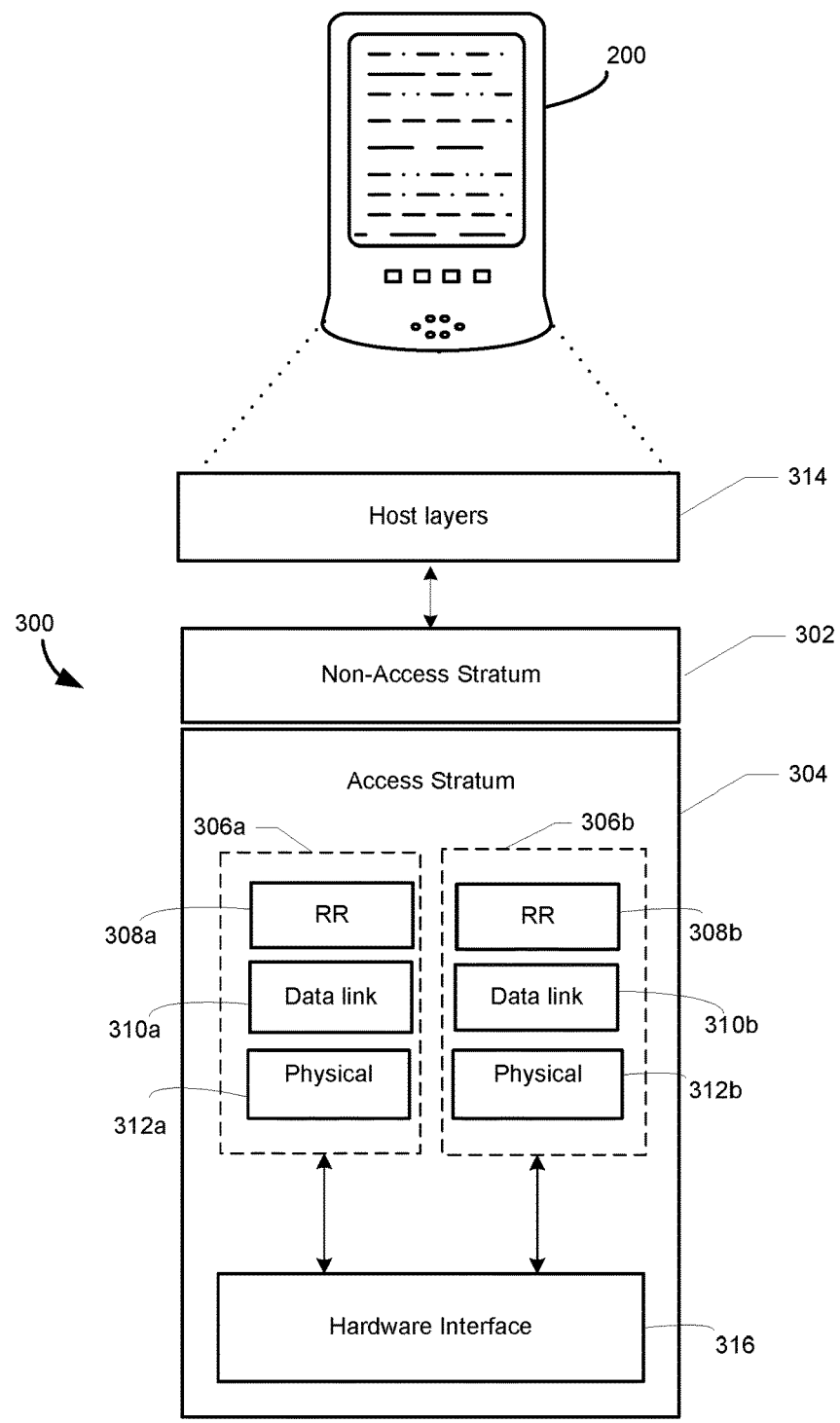
FIG. 3 is a system architecture diagram illustrating example protocol layer stacks implemented by the wireless communication device of FIG. 2.

FIG. 3 illustrates an example of a software architecture with layered radio protocol stacks that may be used in data communications on an MSMS wireless communication device. Referring to FIGS. 1-3, the wireless communication device 200 may have a layered software architecture 300 to communicate over access networks associated with SIMs. The software architecture 300 may be distributed among one or more processors, such as baseband-modem processor 216. The software architecture 300 may also include a Non Access Stratum (NAS) 302 and an Access Stratum (AS) 304. The NAS 302 may include functions and protocols to support traffic and signaling each SIM of the wireless communication device 200 (e.g., SIM-1 204a, SIM-2 204b) and their respective core networks. The AS 304 may include functions and protocols that support communication between each SIM (e.g., the SIM-1 204a, SIM-2 204b)) and entities of their respective access networks (e.g., a MSC in a GSM network, eNodeB in an LTE network, etc.).

In the wireless communication device 200, the AS 354 may include multiple protocol stacks, each of which may be associated with a different SIM. For example, the AS 304 may include protocol stacks 306a, 306b, associated with the first and second SIMs 204a, 204b, respectively. Although described below with reference to GSM-type communication layers, protocol stacks 306a, 306b may support any of variety of standards and protocols for wireless communications. In particular, the AS 304 may include at least three layers, each of which may contain various sublayers. For example, each protocol stack 306a, 306b may respectively include a Radio Resource (RR) sublayer 308a, 308b as part of Layer 3 (L3) of the AS 304 in a GSM or LTE signaling protocol. The RR sublayers 308a, 308b may oversee the establishment of a link between the wireless communication device 200 and associated access networks. In the various embodiments, the NAS 302 and RR sublayers 308a, 308b may perform the various functions to search for wireless networks and to establish, maintain and terminate calls. Further, the RR sublayers 308a, 308b may provide functions including broadcasting system information, paging, and establishing and releasing a radio resource control (RRC) signaling connection between a multi-SIM wireless communication device 200 and the associated access network.

While not shown, the software architecture 300 may include additional Layer 3 sublayers, as well as various upper layers above Layer 3. Additional sub-layers may include, for example, connection management (CM) sublayers (not shown) that route calls, select a service type, prioritize data, perform QoS functions, etc.

Residing below the Layer 3 sublayers (RR sublayers 308a, 308b), the protocol stacks 306a, 306b may also include data link layers 310a, 310b, which may be part of Layer 2 in a GSM or LTE signaling protocol. The data link layers 310a, 310b may provide functions to handle incoming and outgoing data across the network, such as dividing output data into data frames and analyzing incoming data to ensure the data has been successfully received In some embodiments, each data link layer 310a, 310b may contain various sublayers, such as a MAC sublayer, a radio link control (RLC) sublayer, and a packet data convergence protocol (PDCP) sublayer, each of which form logical connections terminating at the access network. In various embodiments, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ. In the uplink, the media access control (MAC) sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, DRX, and HARQ operations.

Residing below the data link layers 310a, 310b, the protocol stacks 306a, 306b may also include physical layers 312a, 312b, which may establish connections over the air interface and manage network resources for the wireless communication device 200. In various embodiments, the physical layers 312a, 312b may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stacks 306a, 306b provide functions to transmit data through physical media, the software architecture 300 may further include at least one host layer 314 to provide data transfer services to various applications in the wireless communication device 200. In other embodiments, application-specific functions provided by the at least one host layer 314 may provide an interface between the protocol stacks 306a, 306b and the general purpose processor 206. In some embodiments, the protocol stacks 306a, 306b may each include one or more higher logical layers (e.g., transport, session, presentation, application, etc.) that provide host layer functions. For example, in some embodiments, the software architecture 300 may include a network layer (e.g., IP layer) in which a logical connection terminates at a gateway (e.g., PGW 163). In some embodiments, the software architecture 300 may include an application layer in which a logical connection terminates at another device (e.g., end user device, server, etc.). In some embodiments, the software architecture 300 may further include in the AS 304 a hardware interface 316 between the physical layers 312a, 312b and the communication hardware (e.g., one or more RF resource).

In various embodiments, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

As described, the modem stacks in various embodiments may support any of a variety of current and/or future protocols for wireless communications. For examples, the modem stacks in various embodiments may support networks using radio access technologies described in 3GPP standards (e.g., GSM, UMTS, LTE, etc.), 3GPP2 standards (e.g., 1×RTT/CDMA2000, EV-DO, UMB, etc.) and/or IEEE standards (WiMAX, Wi-Fi, etc.).

While access to an LTE network may be referred to herein with respect to the first SIM of the wireless device, it will be understood that network access procedures are performed on a modem stack associated with an IMSI (i.e., SIM) in the LTE system. That is, reference to the wireless communication device in various procedures and/or communications with a network may be a general reference to the user equipment associated with a subscription in the network. As such, a SIM transferred to different user equipment may be characterized as the same wireless communication device for purposes of network connections.

The RACH is a shared uplink transport channel carried by a corresponding physical channel (i.e., physical RACH (PRACH)). Use of the RACH may be for various signaling purposes, such as registering a wireless device to the network after power-on, transitioning between different states/modes (i.e., radio resource control (RRC) states in UMTS), performing location updates, and initiating a communication to a target wireless device, etc.

A wireless communication device may access an LTE network (i.e., E-UTRAN) by connecting to a serving cell. Such connecting in LTE involves cell search and cell selection, derivation of system information, and performing an access procedure that is initiated using random access. The cell search may involve performing a hierarchical search for LTE radio cells, which are identified by physical cell identities (PCIs). Specifically, the wireless communication device may tune to each supported LTE channel and measure the received signal strength indicator (RSSI) on each. Such channels may be determined based on LTE frequency bands supported by the operator, which may be stored in a SIM or in non-volatile memory on the device. The wireless communication device may decode synchronization and reference signals to find the physical cell identity of each channel that has an RSSI greater than a threshold value.

The wireless communication device may decode system information blocks (SIBs) to determine the public land mobile network (PLMN) for the identified cell (i.e., in SIB1). As a result, the wireless device may develop a list with frequency, PCI, and PLMN of each identified cell, from which a cell may be selected for camping. In particular, the device may find a suitable cell by finding a cell that transmits power strong enough to be detected by wireless device (based on values decoded from SIB), that is not barred, and that has a PLMN matching that of a selected PLMN.

In this manner, the wireless communication device may camp on a serving cell, and transition between two states/modes defined by the RRC protocol; RRC idle mode, and RRC connected mode. In the RRC idle mode, the wireless communication device is not known in the E-UTRAN, but may receive broadcast system information and data, decode a paging channel to detect incoming calls, perform neighbor cell measurements, and perform cell reselections. In the RRC connected mode, the wireless communication device may be able to transmit data to and receive data from the network by an RRC connection established with a serving eNodeB that handles mobility and handovers. The access procedure that establishes a connection to the LTE network on the wireless communication device may be an RRC Connection establishment procedure. The RRC Connection establishment may involve Signaling Radio Bearer 1 (SRB1) establishment that is described in 3GPP TS 25.331 v. 3.3.0, entitled "Radio Resource Control (RRC); Protocol specification" (1999).

Establishing an RRC connection may be initiated, for example, by the wireless communication device, and may involve performing contention-based random access signaling. In an example access procedure, the wireless communication device (or modem stack associated with a first SIM) may transmit an RRC Connection Request message to the eNodeB of the corresponding LTE network using RACH on the physical RACH (PRACH). The RRC Connection Request message may include an identifier of the wireless communication device, and an establishment cause determined by the Non-Access Stratum (NAS) procedure for which the connection is being established (e.g., Initial Access, etc.).

In response, the eNodeB may transmit an RRC Connection Setup message to the wireless communication device on the physical downlink shared channel (PDSCH). The duration of time between transmission of the RRC Connection Request and receiving a response from the network may vary depending on a number of factors, such as radio access technology, network availability, contention with other wireless devices using the same preamble, etc. In various embodiments, a maximum amount of time in which the wireless communication device waits to receive a response to the RRC Connection Request (e.g., an RRC Connection Setup message) may be configured by the network, and broadcast within system information (e.g., in SIB2). After transmitting the RRC Connection Request message, the wireless communication device may start a retry timer (i.e., T300 timer in LTE and UMTS) with a value set to such maximum amount of time configured by the network. Such maximum amount of time may be, for example, 1-3 seconds. Upon receiving the RRC Connection Setup message, the wireless communication device may complete the procedure by sending an RRC Connection Setup Complete message to the eNodeB on the PUSCH, and transitioning to the RRC connection mode. The RRC Connection Setup Complete message may include a message type, a transaction identifier, and a selected PLMN identity, among other information.

Although described below with reference to LTE-type and GSM-type communication layers, the modem stacks in various embodiments may support any of a variety of current and/or future protocols for wireless communications. For examples, the modem stacks in various embodiments may support networks using other radio access technologies described in 3GPP standards (e.g., UMTS, etc.), 3GPP2 standards (e.g., 1xRTT/CDMA2000, Evolved Data Optimized (EVDO), Ultra Mobile Broadband (UMB), etc.) and/or IEEE standards Worldwide Interoperability for Microwave Access (WiMAX), Wi-Fi, etc.).

As discussed, the shared RF resource may periodically tune away from processes on the first SIM in order to decode a paging channel associated with the second SIM. In various embodiments, RLC automatic repeat request (ARQ) functions support both acknowledged and unacknowledged data transfer modes. In the acknowledged mode, the RLC (or other Layer 2 entity depending on the radio access technology) ensures retransmission by the sender of data blocks that are not received or correctly decoded at the receiver. In the unacknowledged mode, there is no such retransmission by the sender. During an access procedure, the connection request message may be sent in an unacknowledged mode (i.e., using RACH), and therefore there is no mechanism for confirming that the network received the request. Thus, any downlink messages from the network that are transmitted during a tune-away will be dropped and the data not recovered. Therefore, decoding the paging channel to receive paging messages from the network associated with the second SIM may cause degradation of throughput for communications on the modem stack associated with the first SIM.

Alternatively, since the wireless communication device will wait a long period of time to receive the network response (e.g., 1-3 seconds) before restarting the access procedure, if tune-aways periods are blocked until after a downlink response from the network, a paging message for the second SIM may be unnecessarily missed, particularly if no response is actually received. The specific duration of a tune-away period may depend on the particular network and radio access technology enabled by the second SIM and implemented by the second network. For example, for a second SIM configured to connect to a GSM network, the RF resource release gap may be around 20 ms, centered at the page decode time may be around 6 ms, but may require around 20 ms including the establishment and teardown of radio links with the second network.

While tune-away periods to decode the paging channel are relatively short (e.g., 20 ms or less), tune-away periods for idle mode tasks other than paging occasions on the modem stack associated with the second SIM (i.e., cell reselection, reading system information blocks (SIBs), etc.) may be longer. While these non-paging tune-away periods are not set to a schedule, prolonged delay in these processes may also degrade performance on the wireless communication device.

In the various embodiments, an adaptive access procedure may be implemented in order to allocate use of the shared RF resource between the modem stacks associated with the first and second SIMs. The adaptive access procedure may involve utilizing information about the paging cycle for the modem stack associated with the second SIM to delay or adjust the signaling on RACH performed by the modem stack associated with the first SIM. For example, if a paging occasion in the network associated with the second SIM will occur before the end of a time window in which the network response is likely to be received, the connection request message (e.g., RRC Connection Request in LTE) may be delayed until after a tune-away.

The length of the time window for receiving the network response may be configured based on the particular radio access technology of the network in which the modem stack of the first SIM is camped. The duration for this window, measured from transmission of the connection request message, may be set based on field data calculations to achieve a certain percentile representing the likelihood that a network response message will have been received. For example, based on the radio access technology (e.g., LIE) and received field data observation information, the wireless communication device may calculate that 90% of response messages sent by the LTE network are received within 50 ms of transmitting the RRC Connection Request, that 95% are received within 60 ms, etc. As such, the time window duration may be set to 50 ms (or 60 ms, etc.), which may be incorporated into a timer.

In various embodiments, a first protection window timer may be started upon sending the connection request message to the network, in addition to starting the retry timer. The connection request message (e.g., RRC Connecting Request) may have a value set to the duration of the time window for receiving a network response. In various embodiments, a second protection window timer may also be started upon transmission of the network request message, which may be set to a value in-between those of the first protection window timer and the retry timer. In various embodiments, while the first protection window timer is running, all tune-aways to the network associated with the second SIM may be prevented. That is, there are no paging occasions scheduled based on the determination of the paging cycle performed prior to starting the access procedure, and any tune-aways for non-paging idle mode tasks on the modem stack associated with the second SIM may be blocked.

If the first protection window timer expires before a response is received from the network, tune-aways to the second network may be performed by the wireless device according to the scheduled paging occasions, while non-paging tune-away periods may continue to be blocked. In various embodiments, if the second protection window timer expires without receiving a network response, tune-away periods for all idle mode tasks performed on the modem stack associated with the second SIM may be allowed. If no network response message is received prior to expiration of the retry timer, the adaptive access procedure may be restarted on the modem stack associated with the first SIM.

In some circumstances, the network may transmit a downlink response that denies the connection request, for example, based on the network being currently busy. Upon receiving such denial from the network, the access procedure may be terminated and the wireless communication device may restart the adaptive access procedure. However, in some circumstances and networks, the network response may include a parameter indicating a wait-time that is required before sending a new connection request message. Such a wait-time may be dynamically set by the network, for example, based on current available resources, the total number of devices camped on the network, etc. Therefore, the wireless communication device may start a back-off timer with a value set to the received wait-time, preventing transmission of the connection request message until expiration. In various embodiments, while the back-off timer is running, tune-aways to the network associated with the second SIM may be enabled for all idle mode tasks on the modem stack associated with the second SIM. In this manner, the wireless communication device may avoid unnecessary data loss and delay in establishing a network connection for the first SIM, as well as performing idle mode tasks that require tune-aways for the network associated with the second SIM.

Figure 4A:
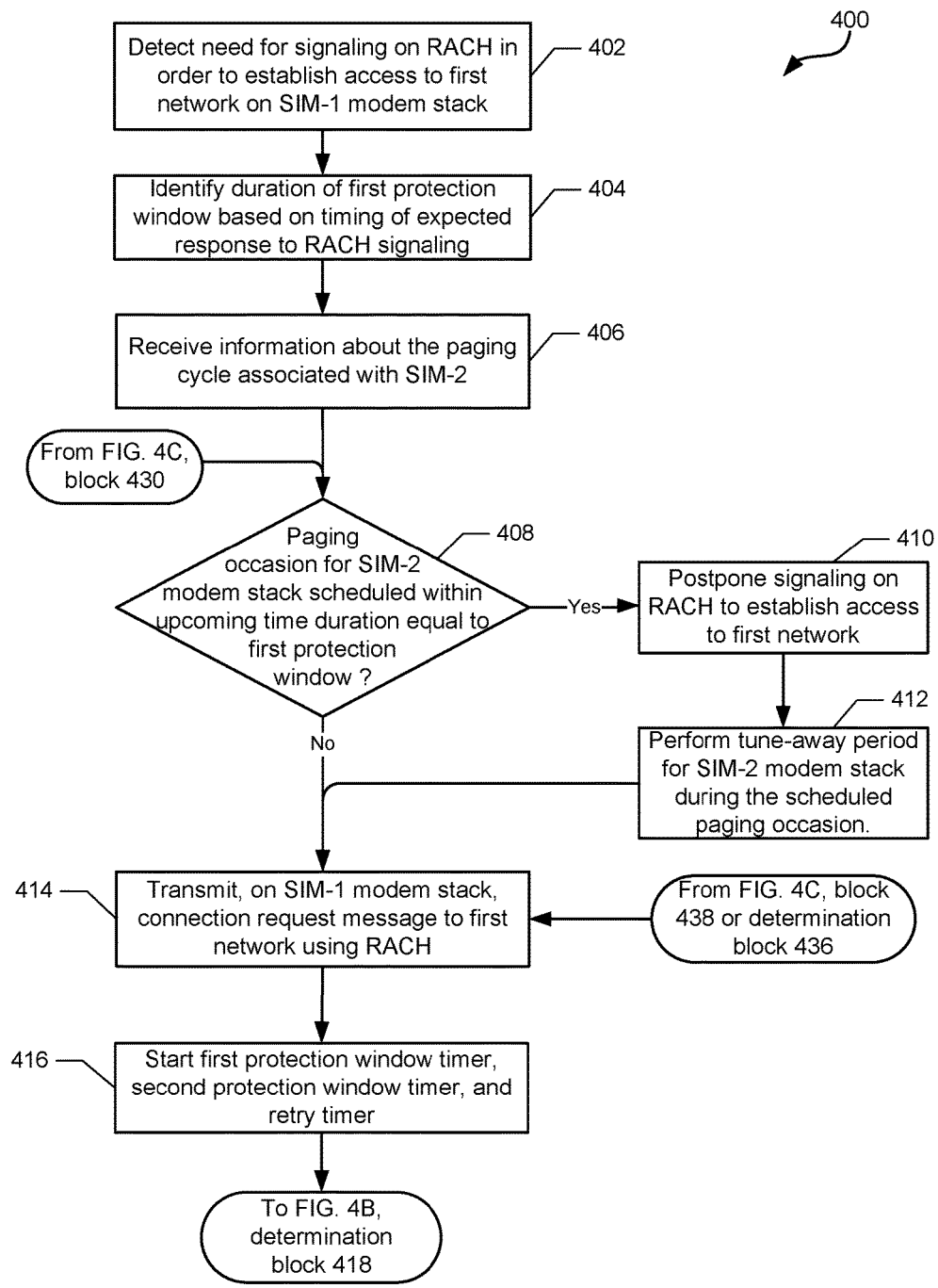
FIGS. 4A-4C are process flow diagrams illustrating a method for implementing an adaptive access procedure to improve performance on a multi-SIM wireless communication device according to various embodiments.
Figure 4B:
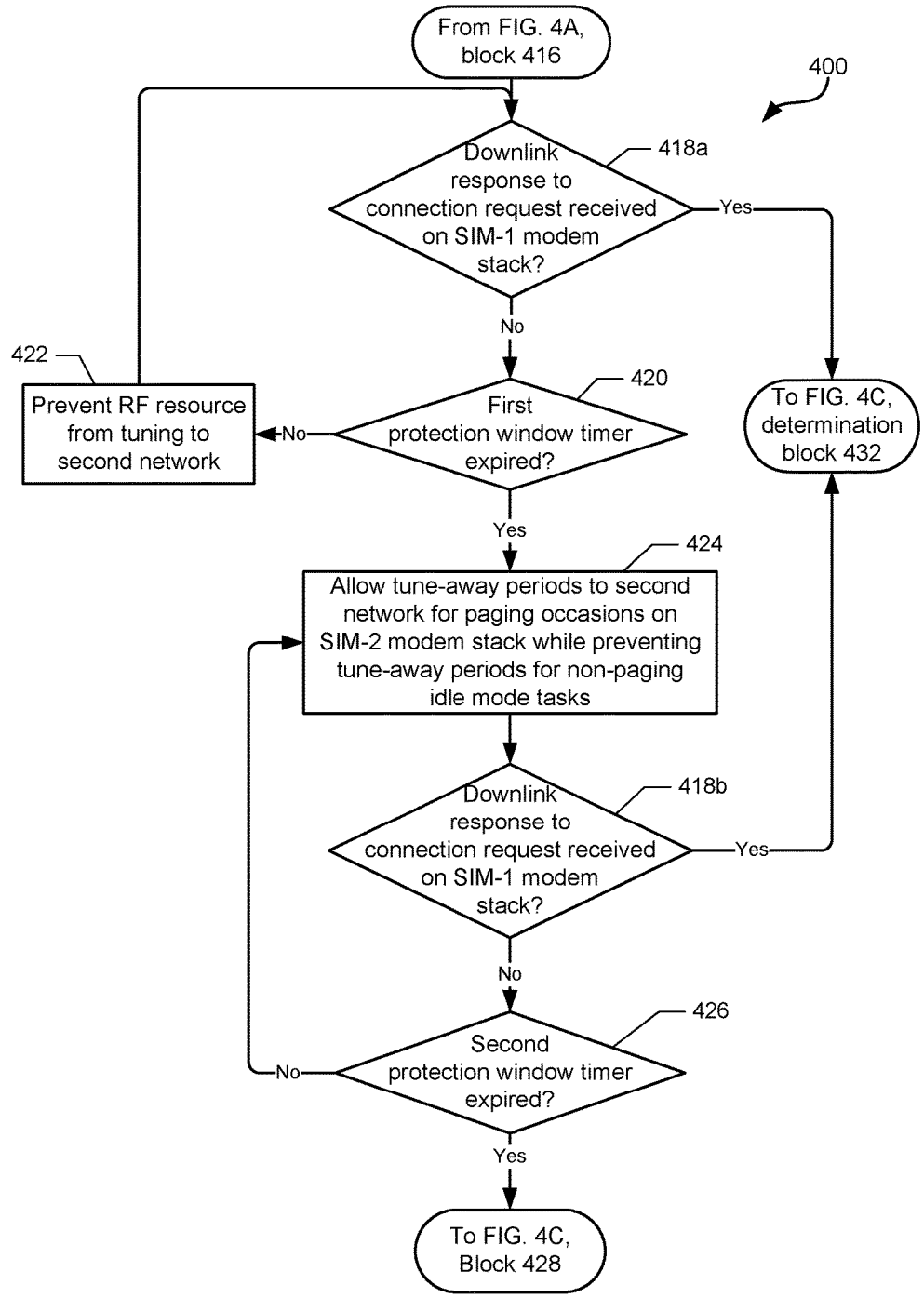
Figure 4C:
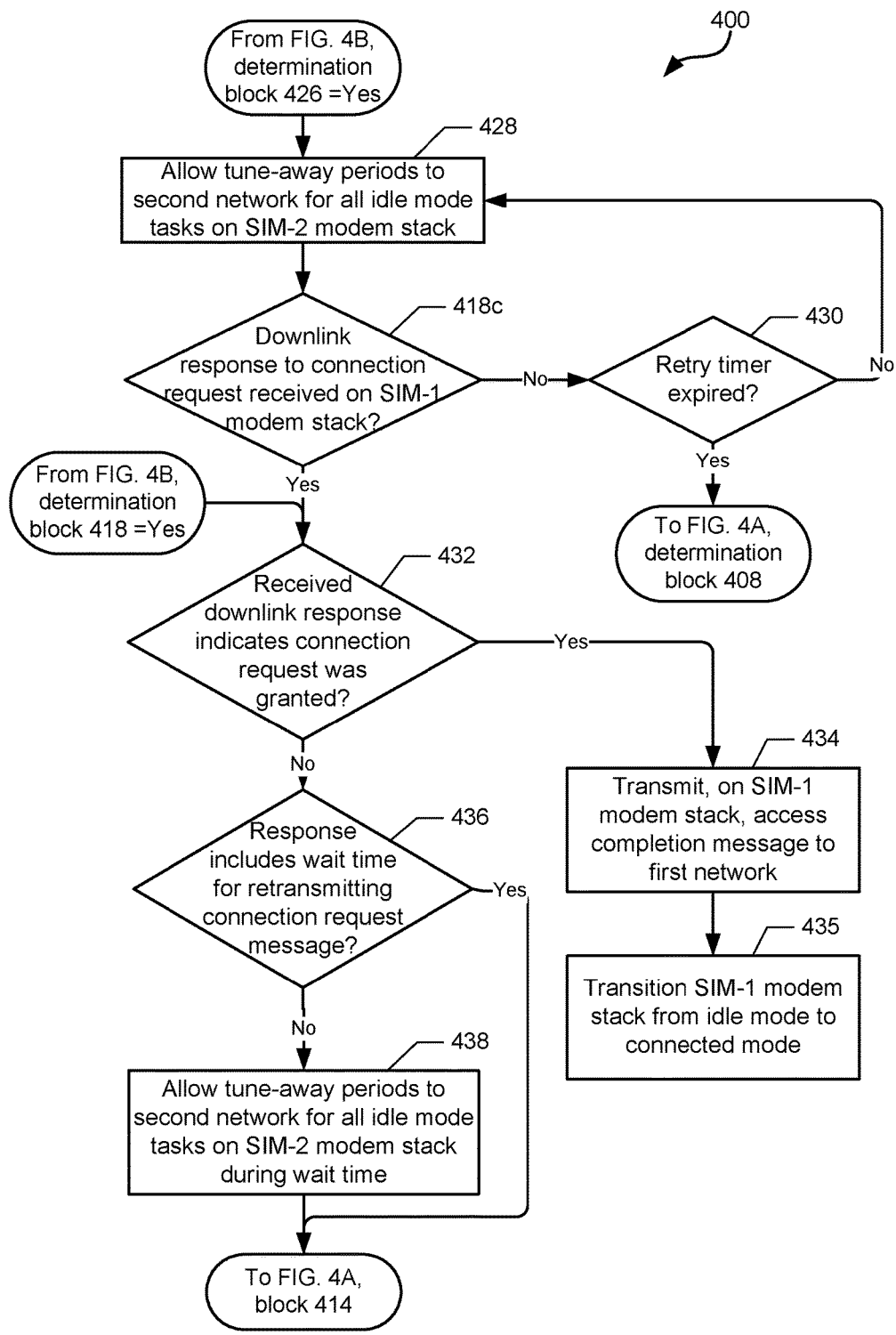

FIGS. 4A-4C illustrate a method 400 for implementing the adaptive access procedure to mitigate delay in connecting to a first network supported by a first SIM while maintaining service and page performance on a second network supported by a second SIM of a multi-SIM multi-standby (e.g., DSDS) wireless communication device. With reference to FIGS. 1-4B, the multi-SIM multi-standby device may be configured with a single shared RF resource (e.g., 218). In various embodiments, the operations of the method 400 may be implemented by one or more processors of the wireless device, such as a general purpose processor (e.g., 206) and/or baseband-modem processor (e.g., 216), or a separate controller (not shown) that may be coupled to memory (e.g., 214) and to a baseband-modem processor. As described, the wireless communication device (e.g., 102, 200) may be a multi-SIM multi-standby (MSMS) device in which at least two SIMs share access to a single RF resource. In various embodiments, the modem stack associated with the first SIM may be camped in the first network using a first radio access technology, and the modem stack associated with the second SIM may be camped in the second network using a second radio access technology. In some instances, the first and second networks may be the same network, while in some instances the first and second networks may be different networks. The modem stacks associated with the first and second SIMs may each be in an idle mode in various embodiments In block 402 (FIG. 4A), the wireless device processor may detect a need for signaling on the RACH in order to establish access to the first network on the modem stack associated with the first SIM ("SIM-1"). In various embodiments, signaling on the RACH in order to access the first network may involve any of a number of procedures, depending on the radio access technology. For example, if the first network uses LTE, an RRC connection establishment procedure may be performed. In various embodiments, the requirement to establish access to the first network may be triggered by the wireless communication device itself, or by the first network. For example, network access may be triggered on the device based on moving to a new cell location (e.g., tracking area), or detecting that the end user has started application that uses data communications (e.g., web browsing, email, voice call, etc.). For example, the wireless device processor may detect an input or other indication for the wireless device to initiate a call to a target device, or exchange data or control information with the first network. The wireless device processor may also detect that the modem stack associated with the first SIM has not been allocated any dedicated channel/resource by the first network. In other examples, establishing network access may be triggered by the first network, such as through a paging message indicating a mobile terminating call for the first SIM on the wireless communication device.

In block 404, the wireless device processor may identify a duration of a first protection window based on the timing of an expected response from the first network to the signaling on RACH. For example, the expected response to the signaling on RACH may be a downlink response message granting or denying the access request.

As described, the wireless device processor may calculate, or receive a calculation of, time durations in which a specified percentage of expected response messages should be received. In various embodiments, the time durations may represent periods of time for which there are corresponding probabilities that any response message sent by the first network will have been received. In various embodiments, there may be a trade-off between certainty (i.e., percentile) of receiving a downlink response message from the first network and the amount of delay to the access procedure. Therefore, in some embodiments the percentile may be dynamically selected based, for example, on current channel conditions, the radio access technology, and/or other factors. In some embodiments, the percentile may instead be a preselected constant that is maintained by the wireless communication device regardless of the radio access technology. In some embodiments, the first protection window may be dynamically adjusted over time based on field data from actual performance on the wireless communication device.

In various embodiments, the timing of the expected network response message, and therefore the first protection window, may depend on the particular radio access technology of the first network. For example, in an LTE network, the duration of the first protection window may be 60-80 milliseconds, while in a WCDMA network the first protection window may be 200-300 milliseconds. In some embodiments, a duration for the first protection window may be calculated by the first network, and received by the device in system information.

In block 406, the wireless device processor may receive information about the paging cycle associated with the second SIM ("SIM-2"). That is, the wireless device processor may be notified of a periodic time interval during which the second network may broadcast pages to a paging group that includes the second SIM, indicating a time at which the modem stack associated with the second SIM will request use of the shared RF resource to tune to the second network in order to decode the paging channel.

In determination block 408, the wireless device processor may determine whether a paging occasion for the modem stack associated with the second SIM is scheduled within an upcoming time duration equal to the first protection window.

In response to determining that a paging occasion for the modem stack associated with the second SIM is scheduled within an upcoming duration of time equal to the first protection window (i.e., determination block 408="Yes"), the wireless device processor may postpone establishing access to the first network on the modem stack associated with the first SIM in block 410.

In block 412 the wireless device processor may perform a tune-away for the modem stack associated with the second SIM during the scheduled paging occasion. That is, the wireless device processor may enable the modem stack associated with the second SIM to use the RF resource to tune to the second network to decode the paging channel.

Following completion of the scheduled tune-away performed in block 412 or in response to determining that no paging occasion for the modem stack associated with the second SIM is scheduled within the upcoming time duration of the first protection window (i.e., determination block 408="No"), the wireless device processor may transmit, on the modem stack associated with the first network, a connection request message to the first network using RACH in block 414.

In block 416, the wireless device processor may start a first protection window timer, a second protection window timer, and a retry timer. In various embodiments, starting such timers may be performed simultaneously with (or at substantially the same time as) transmission of the connection request message in block 414. In various embodiments, the value of the first protection window timer may be set to the identified duration of the first protection window (e.g., in the range of 50-300 ms). As described, the value of the retry timer may be received in system information broadcast by the first network (e.g., 2-3 seconds). In various embodiments, the value of the second protection window timer may be selected by the wireless device processor to be between that of the first protection window timer and the retry timer (e.g., in the range of 500 ms-1 second).

In determination block 418a (FIG. 4B), the wireless device processor may determine whether a downlink response to the connection request has been received on the modem stack associated with the first SIM in determination block 418a.

In response to determining that no downlink response to the connection request has been received on the modem stack associated with the first SIM (i.e., determination block 418a="No"), the wireless device processor may determine whether the first protection window timer has expired in determination block 420. So long as no downlink response has been received and the first protection window timer has not expired (i.e., determination blocks 418a and 420="No"), the wireless device processor may prevent tune-aways to the second network on the modem stack associated with the second SIM in block 422 and again determine whether a downlink response to the connection request has been received on the modem stack associated with the first SIM in determination block 418a. That is, in addition to the lack of paging occasions scheduled during the first protection window as determined in advance, (e.g., determination block 408-block 412) the wireless device processor may block all non-paging idle mode tasks that require tune-away periods to the second network.

In response to determining that the first protection window timer has expired (i.e., determination block 420="Yes"), in block 424 the wireless device processor may allow scheduled tune-away periods to the second network for paging occasions on the modem stack associated with the second SIM, while preventing tune-away periods for non-paging idle mode tasks.

The wireless device processor may again determine whether a downlink response to the connection request has been received on the modem stack associated with the first SIM in determination block 418b. In response to determining that no downlink response to the connection request has been received (i.e., determination block 418b="No"), the wireless device processor may determine whether the second protection window timer has expired in determination block 426. So long as no downlink response is received and the second protection window timer has not expired (i.e., determination blocks 418b and 426="No"), the wireless device processor may continue to allow tune-aways to the second network the RF resource to tune to the second network for the scheduled paging occasions while preventing tune-aways for non-paging idle mode tasks in block 424.

In response to determining that the second protection window timer has expired (i.e., determination block 426="Yes"), the wireless device processor may allow tune-aways to the second network for all idle mode tasks on the modem stack associated with the second SIM in block 428 (FIG. 4C).

The wireless device processor may again determine whether a downlink response to the connection request has been received on the modem stack associated with the first SIM in determination block 418c. In response to determining that no downlink response to the connection request has been received (i.e., determination block 418c="No"), the wireless device processor may determine whether the retry timer has expired in determination block 430. So long as no downlink response has been received and the retry timer has not expired (i.e., determination blocks 418c and 430="No"), the wireless device processor may continue to allow tune-aways to the second network for all idle mode tasks on the modem stack associated with the second SIM in block 428.

In response to determining that the retry timer has expired (i.e., determination block 430="Yes"), the wireless device processor may restart the adaptive access procedure by again determining whether any paging occasion for the modem stack associated with the second SIM is scheduled in the upcoming time duration of the first protection window in determination block 408.

In response to determining that a downlink response to the connection request has been received on the modem stack associated with the first SIM (i.e., determination block 418c="Yes"), the wireless device processor may determine whether the received downlink response indicates that the connection request was granted in in determination block 432. For example, the connection may be granted if the received downlink response is an RRC Connection Setup message.

In response to determining that the received downlink response indicates that the connection request was granted (i.e., determination block 432="Yes"), the wireless device processor may transmit, on the modem stack associated with the first SIM, an access completion message (e.g., RRC Connection Setup Complete message for LTE) to the first network in block 434. Once such access completion message is sent, the modem stack associated with the first SIM may transition from an idle mode to a connected mode (e.g., RRC idle mode to RRC connected mode) in block 435.

In response to determining that the received downlink response indicated that the connection request was not granted (i.e., determination block 432="No"), the wireless device processor may determine whether the response includes a wait-time for retransmitting the connection request message on the modem stack associated with the first SIM in determination block 436. The connection request may not be granted if, for example, the first network does not have sufficient resources, a large number of wireless devices are currently accessing the first network, etc. In some instances, the downlink response received from the first network may contain information that denies the request temporarily may include a wait-time parameter configured by the network. For example, the wait-time may be a period (e.g., 1-5 seconds) during which the modem stack associated with the first SIM is not allowed to send another connection request message.

In response to determining that the response includes a wait-time (i.e., determination block 438="Yes"), the wireless device processor may allow tune-away periods to the second network for all idle mode tasks on the modem stack associated with the second SIM during the wait-time.

Following the wait time or in response to determining that the response does not include a wait-time (i.e., determination block 438="No"), the wireless device processor may retransmit the connection request message to the first network on the RACH in block 404 (FIG. 4A).

The adaptive access procedure according to various embodiments and illustrated in FIGS. 4A-4C allows the wireless communication device to avoid tuning to a network associated with the second SIM when a downlink response message in the access procedure for the first SIM is likely to be received. Further, the adaptive access procedure allows the wireless communication device to avoid an unnecessary delay on the second SIM when a downlink response message in the access procedure for the first SIM is unlikely to be received.

Figure 5:
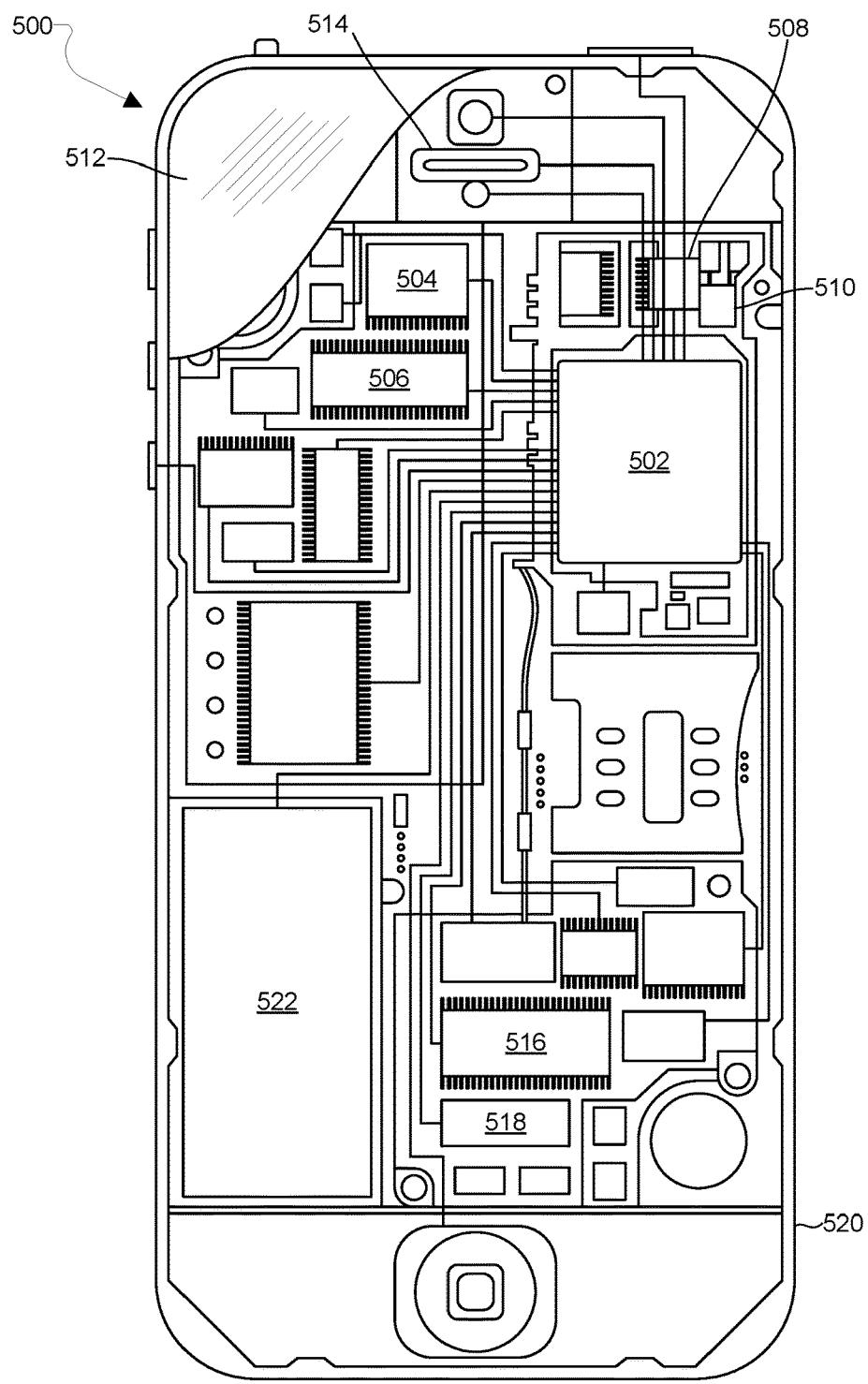
FIG. 5 is a component diagram of an example wireless communication device suitable for use with various embodiments.

Various embodiments may be implemented in any of a variety of wireless devices, an example of which is illustrated in FIG. 5. For example, with reference to FIGS. 1-5, a wireless device 500 (which may correspond, for example, the wireless devices 102, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc.

The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The processor 502 of the wireless device 500 may be coupled to a cellular network wireless modem chip 516 that enables communication via a cellular network.

The wireless device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown).

The wireless device 500 may also include speakers 514 for providing audio outputs. The wireless device 500 may also include a housing 520, constructed of a plastic, metal, or a combination of materials, for containing all or some of the components discussed herein. The wireless device 500 may include a power source 522 coupled to the processor 502, such as a disposable or rechargeable battery. The rechargeable battery may also be coupled to the peripheral device connection port to receive a charging current from a source external to the wireless device 500.

Figure 6:
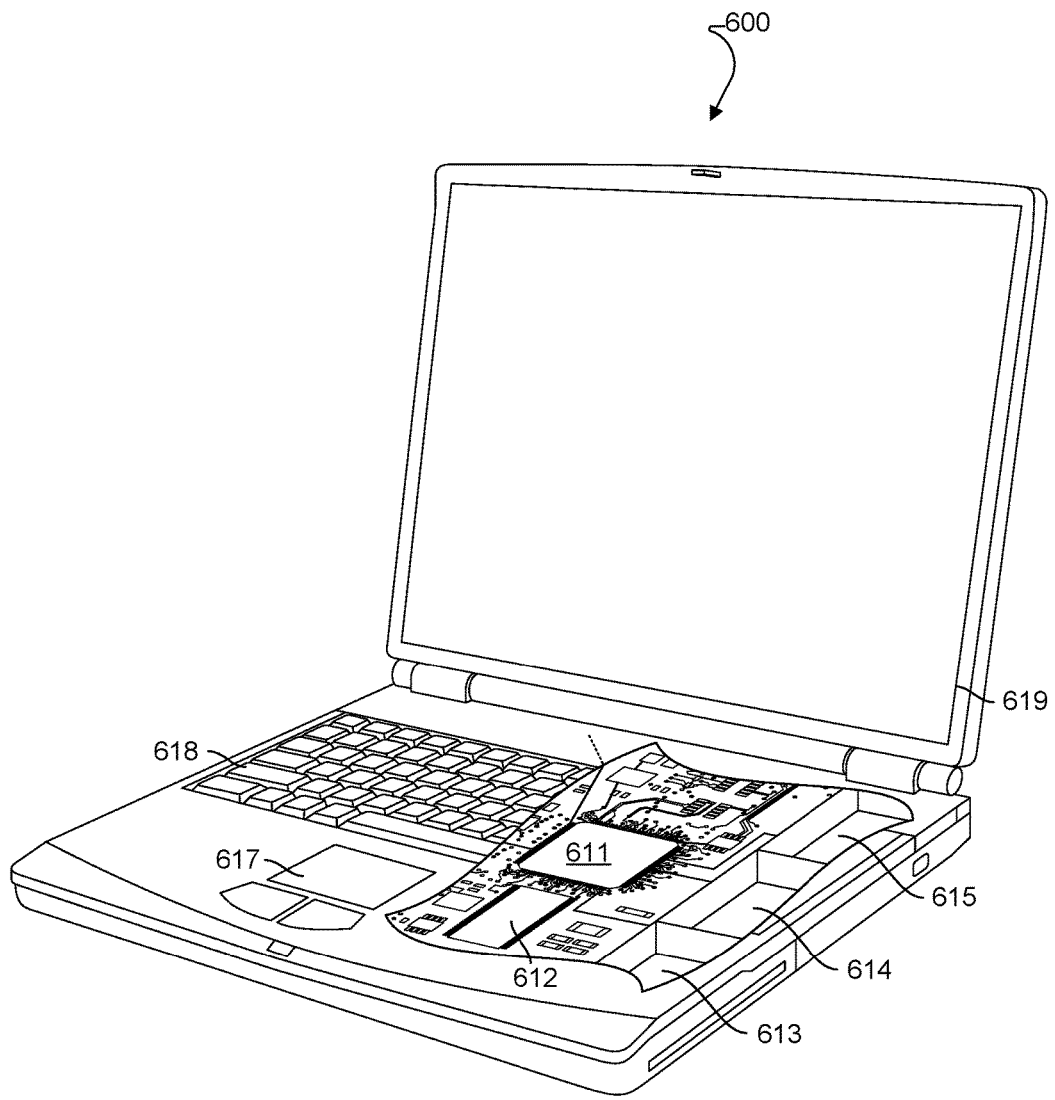
FIG. 6 is a component diagram of another example wireless communication device suitable for use with various embodiments.

Various embodiments described above may also be implemented within a variety of personal computing devices, such as a laptop computer 600 (which may correspond, for example, the wireless devices 102, 200 in FIGS. 1-2) as illustrated in FIG. 6. With reference to FIGS. 1-6, the laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a Universal Serial Bus (USB) or FireWire® connector sockets, or other network connection circuits for coupling the processor 611 to a network. In a notebook configuration, the computer housing includes the touchpad touch surface 617, the keyboard 618, and the display 619 all coupled to the processor 611. Many laptop computers include a touchpad touch surface 617 that serves as the computer's pointing device. Other configurations of the computing device may include a computer mouse or trackball coupled to the processor (e.g., via a USB input) as are well known, which may also be use in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiment, the functions described may be implemented in hardware, software, firmware, or any combination thereof. If implemented in software, the functions may be stored as one or more instructions or code on a non-transitory computer-readable medium or non-transitory processor-readable medium.

The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of performing an adaptive access procedure on a multi-subscriber identity module (SIM) wireless communication device having at least a first SIM and a second SIM associated with a shared radio frequency (RF) resource, the method comprising:

detecting that signaling on a random access channel (RACH) is required in order to establish access to a first network on a modem stack associated with the first SIM, wherein the signaling on the RACH comprises transmitting a connection request message to the first network by the modem stack associated with the first SIM;
identifying a first protection window having a duration based on timing of an expected response by the first network to signaling on the RACH;
determining whether a tune-away period to decode a paging channel in a second network supported by the second SIM is scheduled to occur within the first protection window;
postponing signaling on the RACH until completion of the scheduled tune-away period in response to determining that a tune-away period to the second network supported by the second SIM is scheduled to occur within the first protection window; and
transmitting the connection request message in response to determining that a tune-away period to the second network supported by the second SIM is not scheduled to occur within the first protection window; and
starting a first protection window timer, a retry timer, and a second protection window timer upon transmission of the connection request message.

2. The method of claim 1, wherein identifying a first protection window time duration based on timing of an expected response by the first network to signaling on the RACH comprises:
identifying a radio access technology of the first network;
identifying a percentage that represents an acceptable probability that a downlink response message from the first network will be received on the first modem stack; and
calculating a time duration in which a percentage of downlink response messages that are received using the identified radio access technology corresponds to the identified percentage representing the acceptable probability.

3. The method of claim 2, wherein the percentage of downlink response messages that are received using the identified radio access technology is statistically determined based on field data of a plurality of wireless communication devices, wherein the field data is received from the first network.

4. The method of claim 1, wherein the first protection window timer has a value equal to the time duration of the first protection window, wherein the time duration of the first protection window is within a range of around 50-300 ms.

5. The method of claim 1, wherein:
the retry timer has a value within a range of 1-3 seconds, wherein the value of the retry timer is derived from system information broadcast by the first network; and
the second protection window timer has a value within a range of 500 ms to 1 second, wherein the value of the second protection window timer is in-between the values of the first protection window timer and the retry timer.

6. The method of claim 1, further comprising:
determining whether a downlink response to the connection request message has been received on the modem stack associated with the first SIM;
determining whether the first protection window timer has expired; and
preventing tune-away periods on the RF resource to the second network in response to determining that a downlink response to the connection request message has not been received and that the first protection window timer has not expired.

7. The method of claim 6, further comprising:
determining whether a connection request is granted in response to determining that a downlink response to the connection request message has been received on the modem stack associated with the first SIM;
determining whether the downlink response includes a wait-time for retransmitting the connection request message in response to determining that the connection request was not granted; and
allowing tune-away periods to the second network for all idle mode tasks on the modem stack associated with the second SIM during the wait-time in response to determining that the downlink response includes a wait-time for retransmitting the connection request message.

8. The method of claim 6, further comprising:
allowing scheduled tune-away periods for decoding the paging channel in the second network while preventing tune-away periods for non-paging idle mode tasks in response to determining that the first protection window timer has expired;
determining whether a downlink response to the connection request message has been received on the modem stack associated with the first SIM; and
continuing to allow scheduled tune-away periods for decoding the paging channel in the second network while preventing tune-away periods for non-paging idle mode tasks in response to determining that a downlink response to the connection request message has not been received and that the second protection window timer has not expired.

9. The method of claim 8, further comprising:
determining whether the second protection window timer has expired; and
allowing tune-away periods to the second network for all idle mode tasks in response to determining that the second protection window timer has expired.

10. The method of claim 9, further comprising:
determining whether a downlink response to the connection request message has been received on the modem stack associated with the first SIM;
determining whether the retry timer has expired; and
continuing to allow tune-away periods to the second network for all idle mode tasks in response to determining that a downlink response to the connection request message has not been received and that the retry timer has not expired.

11. The method of claim 1, wherein determining whether a tune-away period to a second network supported by the second SIM is scheduled to occur within the first protection window for the shared RF resource is based on information about a paging cycle associated with the first SIM.

12. A wireless communication device, comprising:
a memory;
a shared radio frequency (RF) resource; and
a processor coupled to the memory and the shared RF resource, wherein the processor is configured to connect to at least a first subscriber identity module (SIM) and a second SIM, and wherein the processor is configured with processor-executable instructions to:
detect that signaling on a random access channel (RACH) is required in order to establish access to a first network on a modem stack associated with the first SIM;
identify a first protection window having a duration based on timing of an expected response by the first network to signaling on the RACH;

determine whether a tune-away period to decode a paging channel in a second network supported by the second SIM is scheduled to occur within the first protection window;

postpone signaling on the RACH until completion of the scheduled tune-away period in response to determining that a tune-away period to the second network supported by the second SIM is scheduled to occur within the first protection window by postponing transmitting a connection request message to the first network by the modem stack associated with the first SIM;

transmit the connection request message in response to determining that a tune-away period to the second network supported by the second SIM is not scheduled to occur within the first protection window; and start a first protection window timer, a retry timer, and a second protection window timer upon transmission of the connection request message.

13. The wireless communication device of claim 12, wherein the processor is further configured with processor-executable instructions to identify the first protection window time duration by:

identifying a radio access technology of the first network;

identifying a percentage that represents an acceptable probability that a downlink response message from the first network will be received on the first modem stack; and calculating a time duration in which a percentage of downlink response messages that are received using the identified radio access technology corresponds to the identified percentage representing the acceptable probability.

14. The wireless communication device of claim 13, wherein the percentage of downlink response messages that are received using the identified radio access technology is statistically determined based on field data of a plurality of wireless communication devices, wherein the field data is received from the first network.

15. The wireless communication device of claim 12, wherein the first protection window timer has a value equal to the time duration of the first protection window, wherein the time duration of the first protection window is within a range of around 50-300 ms.

16. The wireless communication device of claim 12, wherein:

the retry timer has a value within a range of 1-3 seconds, wherein the value of the retry timer is derived from system information broadcast by the first network; and the second protection window timer has a value within a range of 500 ms to 1 second, wherein the value of the second protection window timer is in-between the values of the first protection window timer and the retry timer.

17. The wireless communication device of claim 12, wherein the processor is further configured with processor-executable instructions to:

determine whether a downlink response to the connection request message has been received on the modem stack associated with the first SIM;

determine whether the first protection window timer has expired; and prevent tune-away periods on the RF resource to the second network in response to determining that a downlink response to the connection request message has not been received and that the first protection window timer has not expired.

18. The wireless communication device of claim 17, wherein the processor is further configured with processor-executable instructions to:

determine whether a connection request is granted in response to determining that a downlink response to the connection request message has been received on the modem stack associated with the first SIM;

determine whether the downlink response includes a wait-time for retransmitting the connection request message in response to determining that the connection request was not granted; and allow tune-away periods to the second network for all idle mode tasks on the modem stack associated with the second SIM during the wait-time in response to determining that the downlink response includes a wait-time for retransmitting the connection request message.

19. The wireless communication device of claim 17, wherein the processor is further configured with processor-executable instructions to:

allow scheduled tune-away periods for decoding the paging channel in the second network while preventing tune-away periods for non-paging idle mode tasks in response to determining that the first protection window timer has expired;

determine whether a downlink response to the connection request message has been received on the modem stack associated with the first SIM; and continue to allow scheduled tune-away periods for decoding the paging channel in the second network while preventing tune-away periods for non-paging idle mode tasks in response to determining that a downlink response to the connection request message has not been received and that the second protection window timer has not expired.

20. The wireless communication device of claim 19, wherein the processor is further configured with processor-executable instructions to:

determine whether the second protection window timer has expired; and allow tune-away periods to the second network for all idle mode tasks in response to determining that the second protection window timer has expired.

21. The wireless communication device of claim 20, wherein the processor is further configured with processor-executable instructions to:

determine whether a downlink response to the connection request message has been received on the modem stack associated with the first SIM;

determine whether the retry timer has expired; and continue to allow tune-away periods to the second network for all idle mode tasks in response to determining that a downlink response to the connection request message has not been received and that the retry timer has not expired.

22. The wireless communication device of claim 12, wherein the processor is further configured with processor-executable instructions to determine whether a tune-away period to a second network supported by the second SIM is scheduled to occur within the first protection window for the shared RF resource based on information about a paging cycle associated with the first SIM.

23. A wireless communication device, comprising:

a radio frequency (RF) resource;

means for detecting that signaling on a random access channel (RACH) is required in order to establish access to a first network on a modem stack associated with a first subscriber identity module (SIM);

means for identifying a first protection window having a duration based on timing of an expected response by the first network to signaling on the RACH;

means for determining whether a tune-away period to decode a paging channel in a second network supported by a second SIM is scheduled to occur within the first protection window; and means for postponing signaling on the RACH until completion of the scheduled tune-away period in response to determining that a tune-away period to the second network supported by the second SIM is scheduled to occur within the first protection window comprising means for postponing transmitting a connection request message to the first network by the modem stack associated with the first SIM;

means for transmitting the connection request message in response to determining that a tune-away period to the second network supported by the second SIM is not scheduled to occur within the first protection window; and means for starting a first protection window timer, a retry timer, and a second protection window timer upon transmission of the connection request message.

24. A non-transitory processor-readable storage medium having stored thereon processor-executable instructions configured to cause a processor of a wireless communication device to perform operations comprising:

detecting that signaling on a random access channel (RACH) is required in order to establish access to a first network on a modem stack associated with a first subscriber identity module (SIM) such that the signaling on the RACH comprises transmitting a connection request message to the first network by the modem stack associated with the first SIM;

identifying a first protection window having a duration based on timing of an expected response by the first network to signaling on the RACH;

determining whether a tune-away period to decode a paging channel in a second network supported by a second SIM is scheduled to occur within the first protection window;

postponing signaling on the RACH until completion of the scheduled tune-away period in response to determining that a tune-away period to the second network supported by the second SIM is scheduled to occur within the first protection window;

transmitting the connection request message in response to determining that a tune-away period to the second network supported by the second SIM is not scheduled to occur within the first protection window; and starting a first protection window timer, a retry timer, and a second protection window timer upon transmission of the connection request message.

25. The non-transitory processor-readable storage medium of claim 24, wherein the stored processor-executable instructions are configured to cause the processor of the wireless communication device to perform operations such that identifying the first protection window time duration based on timing of an expected response by the first network to signaling on the RACH comprises:

identifying a radio access technology of the first network;

identifying a percentage that represents an acceptable probability that a downlink response message from the first network will be received on the first modem stack; and calculating a time duration in which a percentage of downlink response messages that are received using the identified radio access technology corresponds to the identified percentage representing the acceptable probability.

26. The non-transitory processor-readable storage medium of claim 25, wherein the stored processor-executable instructions are configured to cause the processor of the wireless communication device to perform operations such that the percentage of downlink response messages that are received using the identified radio access technology is statistically determined based on field data of a plurality of wireless communication devices, wherein the field data is received from the first network.

27. The non-transitory processor-readable storage medium of claim 24, wherein the stored processor-executable instructions are configured to cause the processor of the wireless communication device to perform operations further comprising:

determining whether a downlink response to the connection request message has been received on the modem stack associated with the first SIM;

determining whether the first protection window timer has expired;

preventing tune-away periods on a radio frequency resource to the second network in response to determining that a downlink response to the connection request message has not been received and that the first protection window timer has not expired;

determining whether a connection request is granted in response to determining that a downlink response to the connection request message has been received on the modem stack associated with the first SIM;

determining whether the downlink response includes a wait-time for retransmitting the connection request message in response to determining that the connection request was not granted; and allowing tune-away periods to the second network for all idle mode tasks on the modem stack associated with the second SIM during the wait-time in response to determining that the downlink response includes a wait-time for retransmitting the connection request message.

* * * * *